Dec. 2, 1958 S. P. BRUCE ET AL 2,862,492
HYDRAULIC IN-FEEDING MECHANISM FOR DIAMOND TOOLS
Filed May 27, 1955 2 Sheets-Sheet 1

Inventors
Stanford P. Bruce
Arthur T. Kohlstrunk

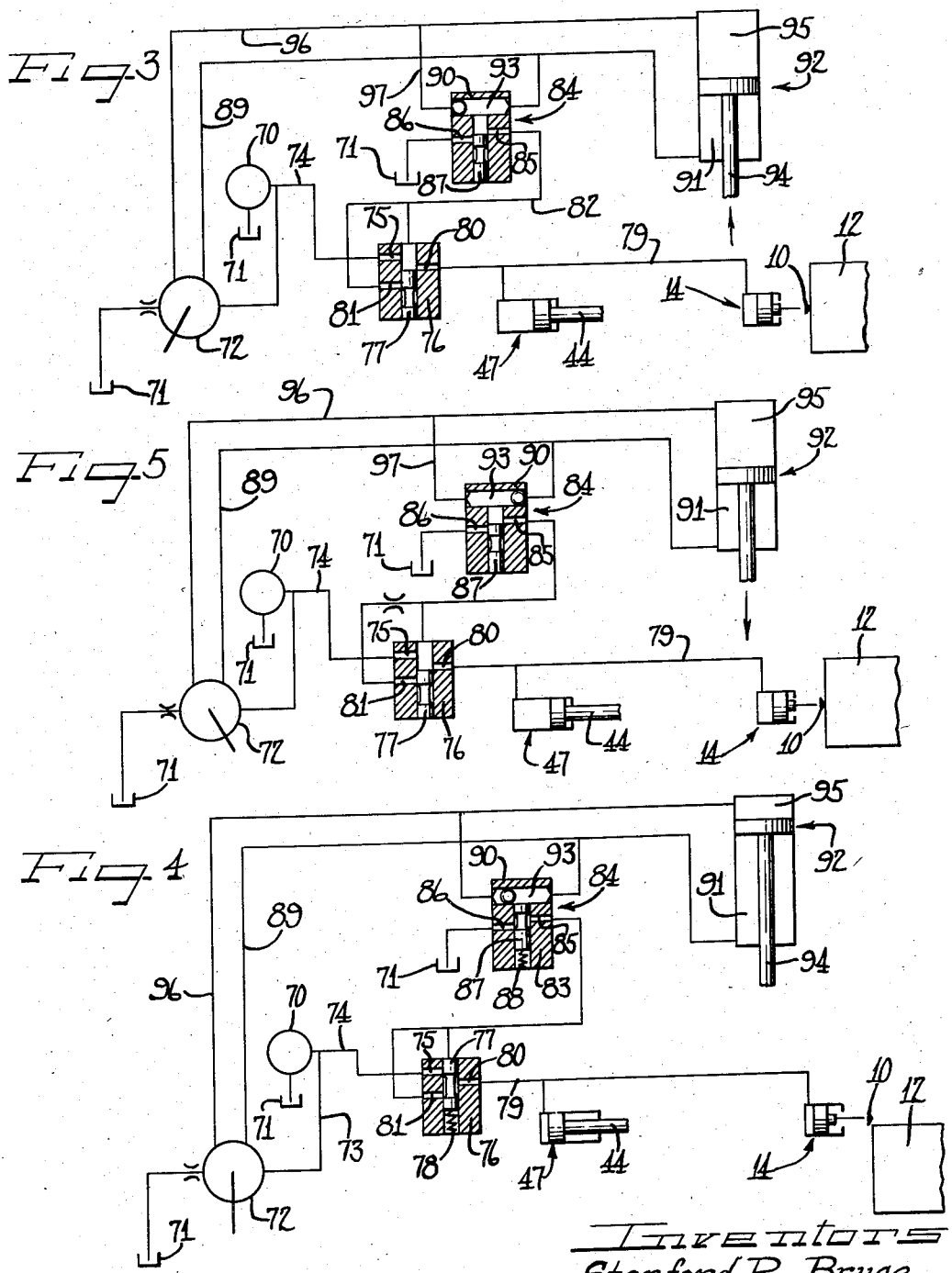

United States Patent Office

2,862,492
Patented Dec. 2, 1958

2,862,492

HYDRAULIC IN-FEEDING MECHANISM FOR DIAMOND TOOLS

Stanford P. Bruce and Arthur T. Kohlstrunk, Detroit, Mich., assignors to Wheel Trueing Tool Company, Detroit, Mich., a corporation of Delaware Application May 27, 1955, Serial No. 511,491

6 Claims. (Cl. 125—11)

The present invention relates to a hydraulic infeeding mechanism for diamond tools, and more particularly relates to a mechanism operable to incrementally advance a diamond tool for dressing grinding wheels and the like.

While it will be appreciated that embodiments of the present invention are devices of general utility, the invention is described here in conjunction with the advancement of diamond tools incrementally forwardly for dressing grinding wheels as an example wherein an embodiment of this invention may enjoy particularly advantageous utility.

This exemplified use of the present invention has been chosen since the in-feeding or incremental advancing of a dressing tool such as a diamond dressing tool on grinding mechanisms such as centerless grinders or the like for dressing the grinding wheels has been particularly time-consuming and awkward heretofore. Prior to the present invention it was necessary for the operator of the grinding machine to leave his stock loading station at the front of the machine and move to the side of the machine or the rear of the machine and then return to his position at the front of the machine at least twice in the normal course of dressing the grinding wheel between grinding operations. This time-consuming movement of the operator of the machine was required to be made several times since the operator was required to leave his stock loading station and move to the side or rear of the machine in order to manually advance the dressing tool and open a fluid coolant valve. Thereafter, the operator was required to turn to the front of his machine in order to actuate the traversing mechanism which set the dresser assembly in operation for the first or rough pass across the wheel.

After the first rough pass was completed, the operator was required to return to the manual advancing mechanism for the dressing tool in order to slightly further advance the dressing tool for the final dressing cut. Then the operator was required to return to the front of the machine to reactivate the traversing mechanism.

Finally, the operator had to move away from his stock loading station still a third time to operate the coolant liquid valve.

This manner of advancing the dressing tool was thus extremely time-consuming and therefore expensive. Additionally, since the advancing operation for the diamond tool was carried out manually, in many instances the tool was advanced by an increment which was either too great or too small with a resultant effect of either taking much more material from the grinding wheel than was necessary, or insufficiently dressing the wheel. By such a manual operation, even if the dressing of the grinding wheel was finally effected properly, it was nevertheless a non-uniform dressing operation from one dressing of the wheel to the next dressing of the wheel.

By the principles of the present invention, however, the entire dressing operation may be accomplished without any requirement on the part of the operator of the grinding machine to leave his stock loading station and the dressing operation together with the dressing tool incremental advancement for both the rough cut and the finish cut may be effected automatically or semi-automatically. Additionally, by use of the principles of this invention, the incremental advancement of the dressing tool may be held uniformly at substantially any desired depth of cut.

Thus, by this invention, there is provided a new and improved system operable to effect advancement of the dressing tool, indexing of the dressing tool, and traversal of the grinding wheel by the dressing tool together with initiation and stoppage of the flow of liquid coolant. Also, by this invention there is provided a new and improved mechanism operable by hydraulic actuation to incrementally advance or "in-feed" the dressing tool which may be a diamond tool.

An embodiment of this invention such as is illustrated in the drawings includes a lead screw which is coupled to the dressing tool through an indexing mechanism for incrementally rotating the tool to keep the head thereof sharp. This lead screw when incrementally rotated will incrementally advance the tool, and for this purpose, the lead screw is coupled to a one-way or overrunning clutch which is in turn oscillatably driven by a gear coupled to a rack or worm on the piston rod of a piston and cylinder assembly operable to be hydraulically actuated. In this mechanism, actuation of the piston and cylinder assembly will drive the piston which in turn will drive the gear or gear segment and the gear or gear segment will in turn drive the one-way clutch to drive the screw and thereby incrementally advance the dressing tool or in-feed the dressing tool.

The advancement of the tool is controlled by controlled and varied setting of the piston whereby the tool in-feed assembly may be adjusted for small incremental in-feeding of the tool or for large steps of incremental advancement of the tool.

To control the step-by-step operation of the in-feeder, the present invention contemplates a new and improved hydraulic actuation system which is completely controllable from any remote position such as the stock loading station of the operator of the grinding machine, and will be described in detail hereinbelow.

Accordingly, it is an important object and feature of the present invention to provide a new and improved mechanism for incrementally advancing a member to be incrementally advanced.

Still another object of the present invention is to provide a new and improved in-feeding mechanism for a dressing tool or the like.

Still another object of the present invention is to provide a new and improved in-feeding mechanism which is hydraulically or otherwise fluid-actuatable for controlled incremental advancement of a member to be so advanced.

Yet another object of the present invention is to provide a new and improved in-feeding mechanism wherein a fluid actuatable piston-cylinder assembly is coupled through a gear segment and an overrunning clutch mechanism to a screw shaft for incrementally rotating the shaft and thereby incrementally advancing a tool.

Still another object and feature of the present invention is to provide a new and improved in-feeding mechanism which is adjustable to variably control the increment of in-feeding accomplished thereby in each operation of the in-feeder.

Still another object of the present invention is to provide a new and improved control system for a dressing mechanism operable to effect controlled traversal of the grinding wheel to be dressed, indexed incremental rotation of the tool, and incremental advancement of the dressing tool.

Still another object of the present invention is to provide a new and improved control system operable to remotely control several phases of an operation of the character described.

Still other objects, features and advantages of the present invention will become readily apparent to those skilled in the art and others, from the following detailed description of the present invention and an embodiment thereof, from the claims, and from the accompanying drawings in which each and every detail shown is fully and completely disclosed as a part of this specification, in which like reference numerals refer to like parts, and in which:

Figure 3 is a schematic illustration of a control system embodying the principles of this invention illustrating the same in an actuating condition for traversal in one direction;

Figure 4 is a schematic illustration of a control system in a neutralized condition; and Figure 5 is a schematic illustration of a control system shown for traversal in a direction opposite to that shown in Figure 3.

As shown on the drawings:

Figure 1:
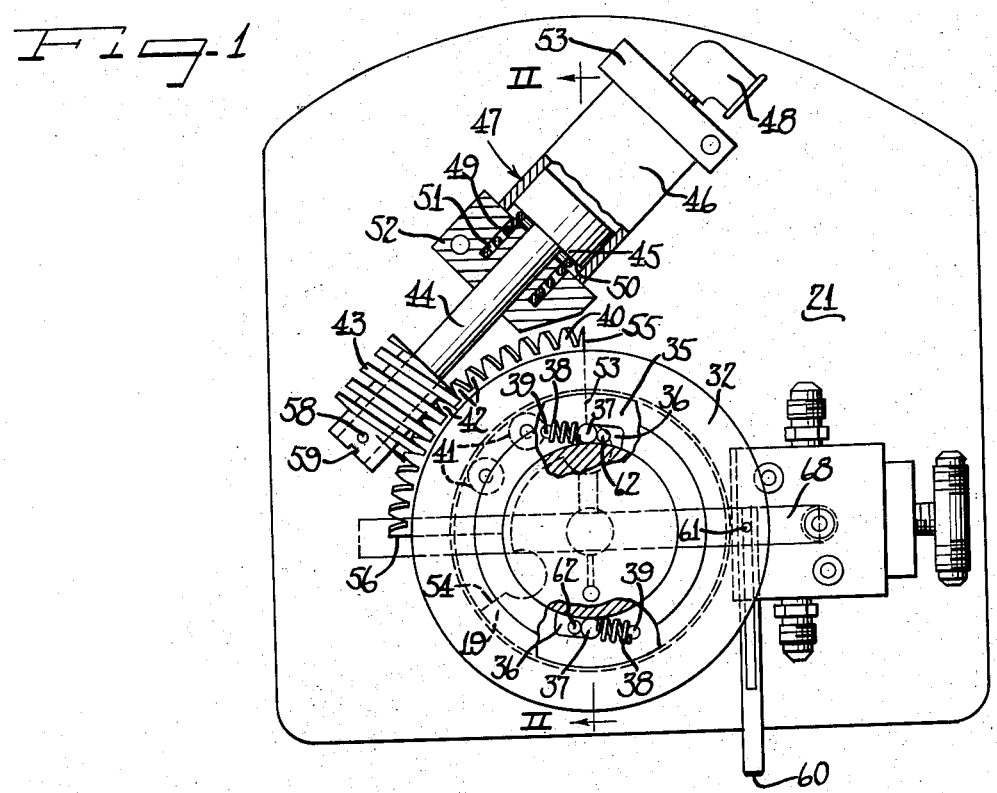
Figure 1 is an elevational partly sectioned and partly broken illustration of an in-feeding mechanism embodying the principles of the present invention and shown with the front cover and dial removed therefrom to better illustrate certain other features of the invention.
Figure 2:
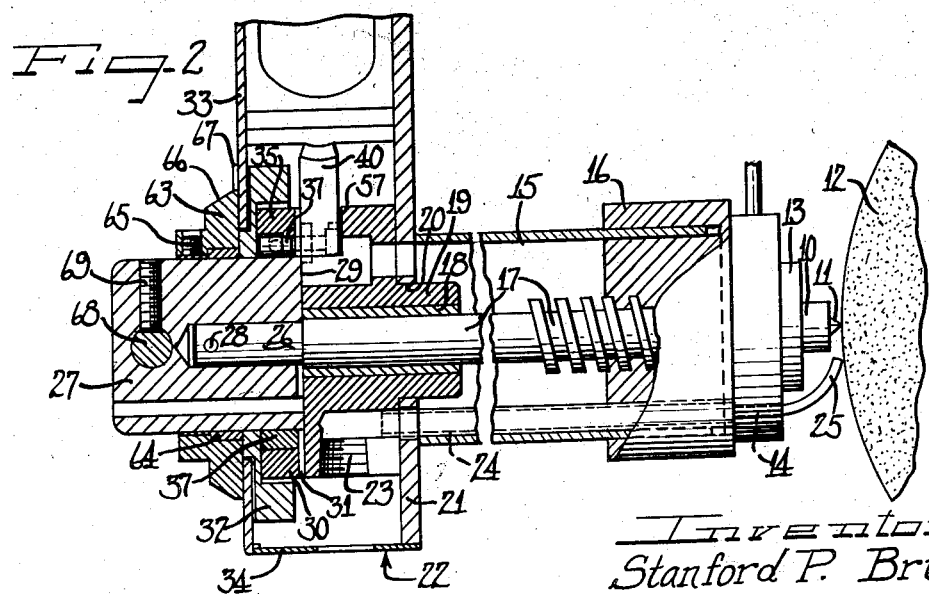
Figure 2 is a sectional view of the device of Figure 1 geared substantially along the section line II—II of Figure 1.

In Figures 1 and 2, there is illustrated an in-feeding mechanism embodying the principles of the present invention and operable to be mounted on a grinding machine such as centerless grinder at the rear of the machine for advancing a tool such as the tool 10 having a cutting or dressing head such as a diamond 11 thereon toward a grinding wheel 12 which is fragmentally illustrated in Figure 2. The in-feeding mechanism is effective upon actuation thereof to incrementally advance the dressing tool and its head whereby when the dressing tool is transversely moved across the grinding wheel the face of the grinding wheel will be dressed and cut in accordance with the contour of a cam bar which is engaged by a follower forming a part of the complete mechanism. Since the cam bar and the follower of the mechanism form no part of the present invention they have not been illustrated here.

To provide for the advancement of the tool 10, the tool is mounted in a tool holder 13 of an indexing mechanism 14 which is operable to incrementally rotate the tool before each traversal of the grinding wheel and is actuatable hydraulically, and the tool indexer 14 is mounted on the dresser barrel 15 which also carries a driving nut 16 threadably engaging a lead screw or screw shaft 17. With this arrangement, incremental rotation of the screw shaft or lead screw 17 will be effective to incrementally advance or retract the tool 10. Under normal operating conditions of the in-feeder, the lead screw 17 will be accurately incrementally rotated to advance the tool 10 by accurate stepped increments.

The lead screw shaft 17 is journalled in a bearing 18 which is fixed in an annular stop block 19 fixed in an aperture 20 in a rear plate or back plate 21 of a housing 22 for the in-feeder mechanism. This stop block 19 is also provided with a threaded coupling passage 23 providing for connections to coolant supply conduits and communicating with a coolant tube 24 leading through the dresser barrel to a nozzle 25 for playing a stream of coolant upon the tool head 11 and grinding wheel 12 during the dressing operation.

At the front end of the lead screw shaft, it is provided with a slightly reduced diameter portion 26 which carries a shaft cylinder 27 that is secured thereto by a taper pin or the like 28 for corotation therewith. The inner face 29 of the shaft cylinder 27 closely abuts the front face of the stop block 19 and thus holds the lead screw shaft against axial movement rearwardly when the screw shaft is rotated in a direction to cause the tool 10 to be retracted. Retaining the lead screw against axial movement forwardly is accomplished by cooperation of a one-way or overrunning clutch mechanism 30, a clutch ring 31 mounted on the outer peripheral surface of the shaft cylinder 27, and a clutch release ring 32 operably disposed against the inner face of a front cover plate 33 on the housing 22 and forming a complete housing together with the back plate 21 and a side plate assembly 34.

Of greater significance, however, in the operational characteristics of the overrunning clutch 30, is that it is so operably assembled together with the shaft cylinder 27, that is is effective to drive the shaft cylinder 27 in only one direction when it is drivingly actuated and to slip on the shaft cylinder when actuated in an opposite direction whereby the shaft cylinder 27 will be incrementally advanced in one angular direction when the one-way clutch 30 is oscillated angularly. To this end, the one-way clutch mechanism 30 includes a clutch ring 31 fixed to a clutch race 35 on the outer periphery of the shaft cylinder 27. On the inner periphery of the clutch race 35 it is provided with a plurality of recesses 36 (Figure 1) which receive rollers 37. The recesses 36 and rollers 37 are so dimensioned that at the angular center of the recesses 36 they have a depth from the outer periphery of the shaft cylinder 27 which is less than the diameter of the roller 37 while the angular ends of the recesses 36 have a dimension greater than the diameter of the roller 37. The rollers 37 are normally positioned at the counter-clockwise extremity of the recesses 36 while springs 38 set in extension recesses 39 in the race 35 normally bias the rollers 37 in a clockwise direction or toward the smaller dimensioned center space (note Figure 1).

With the spacing limited as described, and the springs 38 normally biasing the rollers 37 toward the smaller dimensioned area, any counter-clockwise rotation of the race 35, as the mechanism is viewed in Figure 1, will lock the race 35 to the shaft cylinder 27 through the rollers 37 so that the counter-clockwise rotation of the clutch race 35 will be imparted to the shaft cylinder 27 to counter-clockwise rotate the shaft cylinder and thereby counter-clockwise rotate the lead screw shaft 17 to advance the tool 10. Clockwise rotation of the clutch race 35 will result in a relative movement thereof with respect to the rollers whereby the rollers will move to their counter-clockwise position in the grooves 36 thereby unlocking the race with respect to the shaft cylinder 27 so that the race 35 may be rotated in a counter-clockwise direction without imparting any movement to the lead screw shaft or shaft cylinder. Thus, if the clutch race 35 is oscillated rotationally, the lead screw shaft wil be incrementally rotated and the tool 10 will be incrementally advanced.

To effect this desired oscillation of the clutch race 35, a worm gear or worm gear segment 40 is secured to the clutch ring 31 and to the clutch race 35 by any convenient means such as screws 41 (Figure 1) and the teeth 42 of the gear 40 are drivingly engaged by a worm 43 on the outer end of a piston rod 44 which is connected to a piston 45 reciprocably disposed in an actuating cylinder 46 of a piston and cylinder assembly 47. Actuation of the piston and cylinder assembly causes the piston 45 to drive the piston rod 44 and worm 43 which in turn drives the gear segment 40 drivingly secured to the clutch race 35 which is thereby incrementally angularly driven in a counter-clockwise direction as viewed in Figure 1. Upon return of the piston 45 to a deactuated position in the piston and cylinder assembly 47, the clutch race 35 will be returned in a clockwise direction without effecting any movement of the lead screw shaft 17 as described above. As shown, the piston and cylinder assembly 47 has a single fluid entrance provided at 48 whereby fluid admitted thereto through the entrance 48 will drive the piston 45 downwardly within the cylinder 46. Upon relief of the pressure of the fluid in the cylinder 46, the piston 45 will be returned by action of a spring 49 acting against the underside of the piston 45, as at 50, and bottoming in a recess 51 in a cylinder cap 52 which is secured to the back plate 21 of the housing along with the cylinder head 53 which is also secured to the back plate 21 of the housing to firmly and securely mount the piston and cylinder assembly 47 within the housing and forming a part of the mechanism of this invention.

In this embodiment of the present invention, the incremental rotation of the gear 40 and thereby the incremental advancement of the tool 10 is readily adjustable since the stop block 19 is provided with a pair of stop faces 53 and 54 which are respectively engageable with the clockwise end face 55 and the counter-clockwise end face 56 of the quadrant gear segment 40. These stop faces 53 and 54 in the stop block 19 are provided as the ends of a gear accommodating recess 57 (Figure 2) on the inner end of the stop block 19 in the second and third quadrants thereof as viewed in Figure 1. Thus, with the end face 55 in engagement with the stop face 53 of the stop block 19, as shown in Figure 1, clockwise rotation of the gear segment 40 and the clutch race 35 is limited. While in such a limited return position, the axial position of the worm 43 fixed on the piston rod 44 by a pin or set screw 58 may be adjusted by proper rotation of the worm and piston rod whereby threading engagement of the worm 43 with the teeth 42 will vary the position of the worm 43 to move the same axially upwardly to increase the stroke length of the piston 45 within the cylinder 46 or axially downwardly to decrease the stroke length of the piston 45 within the cylinder 46. This rotational adjusting movement of the worm 43 and piston rod 44 is facilitated by a screw driver slot 59 in the outer end of the worm 43 and piston rod 44. When the worm and rod are adjusted to an axial upward position, the stroke length of the piston in the piston and cylinder assembly will be increased whereby incremental rotation and oscillation of the gear segment 40 will be increased to a greater arc length whereby the lead screw 17 will be incrementally rotated through increments of greater arc length and the tool 10 will be advanced by greater increments to take deeper dressing cuts in the grinding wheel 12. It follows, of course, that adjustment of the piston rod and worm downwardly to a position such as the position shown will allow only a very short stroke length of the piston and thereby allow only a very small incremental advancement of the tool 10.

When dressing of a grinding wheel has been completed through a sufficient number of operations that it is desirable to replace the grinding wheel, or for some other reason it is found desirable to retract the dressing tool, retraction of the dressing tool may be easily accomplished in accordance with this invention by application of an axially upwardly directed force to a clutch release rod 60 which is pinned to the clutch release ring 32 to rotate the clutch release ring 32 slightly counterclockwise, the rod 60 being pinned to the ring 32 by a pin 61. The clutch release ring 32 carries a pair of axially projecting pins 62 which project into the slots 36 behind the rollers 37 so that when the ring 32 is rotated counter-clockwise by manipulation of the rod 60, the pins 62 will hold the rollers 37 in their counter-clockwisemost position against the force of springs 38 so that there will be no locking action between the clutch race 35 and the shaft cylinder 27. This enables the operator to manually rotate the shaft cylinder 27 in either direction, and particularly clockwise as viewed in Figure 1 to retract the tool 10.

Similarly, when desirable, in-feeding of the tool 10 may be accomplished manually and to this end as well as to provide an aid in the adjustment of the increment of automatic in-feeding by adjusting the axial position of the worm 43, the mechanism is provided with an indexed dial 63 secured on a dial insert 64 on the outer periphery of the shaft cylinder 27 externally of the front plate 33. The dial insert 64 is tightly fitted onto the outer periphery of the shaft cylinder 27 and the dial 63 is secured thereover and secured in place by a set screw 65 or the like. The outer edge face 66 of the dial 63 is indicia marked for reading from a pointer 67 on the outer face of the front cover plate 33 so that any rotation of the dial 63 either automatically by operation of the hydraulic system hereinafter described, or other operation of the in-feeder, or manual rotation of the shaft cylinder as hereinabove described through manipulation of the handle bar 68 projecting through a diametric aperture in the shaft cylinder 27 and fixed in place by a set screw 69 or the like, will readily be indicated on the dial 66 in cooperation with the pointer 67 on the cover plate 33.

As set out hereinabove, the present invention contemplates automatic control of not only the in-feeder of this invention described above, but also the tool rotary indexing mechanism 14 and the traversing mechanism, all from the front of the machine at the stock loading station so that the operator need not leave the stock loading station in order to dress the grinding wheel 12. For this purpose, the present invention contemplates a new and improved hydraulic system which is illustrated schematically in Figures 3, 4 and 5 which respectively show taking a rough cut or a first pass cut on the grinding wheel, a neutral position for the system, and taking a second dressing cut or second pass across the grinding wheel. Referring first to Figure 4, which shows the hydraulic system in its neutral position, the system utilizes the hydraulic pump 70 on the grinding machine for pumping oil from a reservoir 71 and pumping the same to feed fluid into the system and particularly to a four-way selector valve 72 through a hydraulic feed tube or pipe 73. When the system is in a neutral position, the pump will be by-passed by the selector switch valve to return the fluid pumped from the supply reservoir or tank 71 back to the tank 71. It should be noted that for convenience in the schematic illustrations of Figures 3, 4 and 5, the reservoir 71 has been illustrated in three individual sections for convenience, it being understood, of course, that the reservoir 71 may be any type of desired fluid reservoir operable in this system.

While the hydraulic system is in a neutral position, the pump 70 will also supply fluid under pressure to a feed pipe or tube 74 which leads to one passage terminal 75 of a pilot sequence valve 76 which is illustrated structurally in Figure 1. This time, however, the passage is closed by the pilot valve piston 77 which is in its deactuated position and held in such position by a biasing member 78 (Figure 4). Also at this time, both the piston and cylinder assembly 47 of the in-feed mechanism and the tool rotary indexing mechanism 14 are hydraulically deactuated and hydraulic fluid may be drained therefrom through a fluid passage tube or pipe 79 leading to a second passage 80 in the pilot sequence valve 76, and this second passage 80 is in communication with a third passage 81 which is connected with a fluid tube 82 leading to an inlet to the pilot valve portion 83 of a ball-check pilot valve 84, the inlet 85 being in communication with an outlet 86 leading back to the reservoir 71. In the ball-check pilot valve 83 the valve piston 87 is also in its neutral deactuated position and is so held by biasing means 88 so as to permit communication between the passages 85 and 86.

To incrementally advance a tool by actuation of the in-feeder mechanism, rotationally incrementally index the tool and then traverse the grinding wheel with the tool, the selector valve, which may be positioned at the front of the machine adjacent to the stock loading station, is moved to the position shown therefor in Figure 3. In such a position, fluid is supplied from the pump 70 through the selector valve 72 and into the passage tube 89 leading to the right side of the ball portion 90 of the ball-check pilot valve 84 and to the rod end 91 of the dresser traveler cylinder and piston assembly 92. Admission of pressurized fluid into the ball-check pilot valve causes a depression of the valve piston 87 and actuation thereof whereby the outlet passage 86 is closed and the inlet passage 85 is open to receive fluid from the ball-check chamber 93 and pass the same to the tube 82 to supply fluid under pressure to the top of the valve piston 77 of the pilot sequence valve 76 whereby the pilot sequence valve is actuated. Then, with the pilot sequence valve actuated the pump 70 will supply pressurized hydraulic fluid through the passages 74 into the first inlet 75 of the valve 76, the pressurized fluid then passing through the second passage 80 to the flow tube 79 for actuation of both the in-feed piston and cylinder assembly 47 and the rotary indexer 14. By this sequence of events, the in-feed cylinder and rotary indexing mechanism are both actuated prior to engagement of the dressing tool 10 with the wheel 12 as the dressing tool is traversely moved by its coupling with the piston 94 of the dresser transverse piston and cylinder assembly 92. It is noted here that the fluid in the cap end 95 of the dresser traveler cylinder and piston assembly 92 is exhausted through a fluid tube 96 leading to the selector valve and therethrough back to the reservoir 71. The tube 96 also serves at this time to exhaust the closed side of the ball-check chamber 93 of the ball-check pilot valve through a flow tube 97.

At the conclusion of the first pass, the selector valve may be returned to its neutral position whereby the valves are deactuated and the in-feed mechanism and rotary indexing mechanism are also deactuated as evidenced by the hydraulic circuitry of Figure 4.

The second pass of the dressing tool over the grinding wheel and further indexing of the tool and in-feeding thereof is accomplished by moving the selector valve to the position shown therefor in Figure 5. When the selector valve is in the position of Figure 5, pressurized fluid will be supplied to the left side of the ball-check chamber 93 through the tubes 96 and 97, the tube 96 also supplying pressurized fluid to the cap end 95 of the dresser traveler cylinder and piston assembly 92. Fluid supplied to the ball-check pilot valve 84 will so actuate the piston 87 thereof as to admit fluid through the passage 85 to the pilot sequence valve 76 to actuate the piston 77 thereof whereby the pilot sequence valve will permit the passage of fluid from the pump 70 to the in-feed cylinder and piston assembly 47 and to the indexing mechanism 14 for in-feeding the tool and rotationally indexing the same.

Thus, the tool 10 will be in-fed and indexed before the traversing mechanism causes the same to engage the grinding wheel 12. The traversing mechanism will, of course, be actuated through supply of pressure fluid to the cap end 95 thereof while the rod end 91 thereof is exhausted through the passage tube 89 which leads through the selector valve 72 back to the reservoir 71.

From the foregoing it will be readily observed that by the principles of the present invention there is provided a wholly new and improved in-feed mechanism and control system for dressing grinding wheels and the like and that numerous variations and modifications may be effected without departing from the true spirit and scope of the novel concepts and principles of this invention. We, therefore, intend to cover all such modifications and variations as fall within the true spirit and scope of the novel concepts and principles of this invention.

We claim as our invention:

1. In a mechanism for dressing a grinding wheel by traversing the wheel with a dressing tool, means to incrementally advance the dressing tool comprising a housing, a screw shaft journalled in said housing and coupled to said dressing tool whereby incremental rotation of the screw shaft incrementally advances the dressing tool, a one-way drive overrunning clutch coupled to said screw shaft within said housing to rotate the screw shaft when driven in one direction and to slip on the screw shaft when driven in an opposite direction, a worm gear secured to said clutch to drive the same, a worm in driving engagement with said worm gear to drive the worm gear by axial movement of the worm, and a piston and cylinder assembly mounted in said housing with the piston connected to said worm whereby said worm is axially moved upon actuation of the piston and cylinder assembly to displace the piston therein.

2. In a mechanism for dressing a grinding wheel by traversing the wheel with a dressing tool, means to advance the dressing tool an adjustable incremental distance comprising, a housing, a screw shaft journalled in the housing and coupled to said dressing tool whereby incremental rotation of the screw shaft incrementally advances the dressing tool, a one-way drive overrunning clutch coupled to said screw shaft within said housing to rotate the screw shaft when driven in one direction and to slip on the screw shaft when driven in an opposite direction, drive means coupled to said one-way clutch to oscillatably actuate the same, means adjusting the amount of movement of said drive means to thereby vary the increments of said incremental distance and means to release the overrunning clutch from the screw shaft whereby the screw shaft is rotatably operable independent of the drive and overrunning clutch.

3. In a mechanism for dressing a grinding wheel wherein the wheel is traversed by a dressing tool, means to incrementally rotatably index the dressing tool, means to traverse the grinding wheel with the dressing tool, and means to incrementally advance the dressing tool an adjustable incremental distance, and a remotely controllable hydraulic actuating system operable to effect actuation of said means to by-directionally traverse the grinding wheel with said tool and to index the tool and simultaneously incrementally advance the tool prior to engagement of the tool with the grinding wheel upon traversal of the grinding wheel by the tool in each direction.

4. In a mechanism for dressing a grinding wheel wherein the wheel is traversed by a dressing tool, means to drive the tool to traverse the grinding wheel, means to rotatably index the tool, and means to incrementally advance the tool, and a hydraulic system coupled to all of said means and including a ball-check pilot valve controllably actuating a pilot sequence valve permitting pressurized fluid to flow to the rotatable indexing means and the incremental advancing means whereby the tool is advanced and indexed before the tool engages the grinding wheel in traversing movement.

5. An incremental advancing mechanism comprising a housing, a lead screw shaft journalled in said housing, an overrunning clutch coupled to said screw shaft, a stop block in said housing, a gear segment secured to said clutch mechanism and oscillatable between positions of engagement with said stop block, comprising a reciprocable member connected to said gear segment, and means for adjusting the stroke of reciprocation of the reciprocable member to vary the increment of movement of said screw shaft upon reciprocation of said reciprocable member means to oscillatably drive said gear segment.

6. An incremental advancing mechanism comprising a housing, a screw shaft journalled in said housing, an overrunning clutch coupled to said screw shaft, a gear secured to the overrunning clutch, a worm in driving connection with said gear, piston and cylinder means connected to said worm to oscillatably drive the gear and clutch, and means to adjust the position of the worm on the gear whereby the arc length of oscillation is variably controllable.

(References on following page)

References Cited in the file of this patent

UNITED STATES PATENTS

| | | |
|---|---|---|
| 1,550,996 | Wilcox | Aug. 25, 1925 |
| 1,919,288 | Bath | July 25, 1933 |
| 1,926,470 | Wineland | Sept. 12, 1933 |
| 1,928,162 | Asbridge | Sept. 26, 1933 |
| 1,976,124 | Haas | Oct. 9, 1934 |
| 1,997,551 | Romaine | Apr. 9, 1935 |
| 2,101,242 | Crowdson | Dec. 7, 1937 |
| 2,522,481 | Martin | Sept. 12, 1950 |
| 2,522,485 | Silven | Sept. 12, 1950 |
| 2,635,646 | Payne | Apr. 21, 1953 |
| 2,641,873 | Haas | June 16, 1953 |
| 2,648,171 | Hill | Aug. 11, 1953 |